United States Patent [19]

Yoshimura

[11] Patent Number: 5,007,795
[45] Date of Patent: Apr. 16, 1991

[54] SUPPLY HEAD OF NUT FEEDER

[75] Inventor: Masahiro Yoshimura, Nagoya, Japan

[73] Assignee: Yajima Kogyo, Inc., Nagoya, Japan

[21] Appl. No.: 418,311

[22] Filed: Oct. 6, 1989

[51] Int. Cl.⁵ .................................................. B66L 1/00
[52] U.S. Cl. ................................... 414/737; 901/40; 198/468.5; 221/212
[58] Field of Search ............... 198/409, 468.5; 901/40; 221/212; 414/737

[56] References Cited

U.S. PATENT DOCUMENTS 2,613,009  10/1952  Cranor .......................... 221/212 X

FOREIGN PATENT DOCUMENTS

| 3535610 | 4/1987 | Fed. Rep. of Germany | 901/40 |
| 0266335 | 3/1989 | Fed. Rep. of Germany | 901/40 |
| 56-14943 | 4/1981 | Japan . | |
| 0127941 | 7/1985 | Japan | 198/468.5 |
| 0022724 | 1/1989 | Japan | 901/40 |
| 0104515 | 4/1989 | Japan | 221/212 |
| 0209219 | 8/1989 | Japan | 198/468.5 |

Primary Examiner—Robert P. Olszewski
Assistant Examiner—James R. Bidwell
Attorney, Agent, or Firm—Armstrong, Nikaido, Marmelstein, Kubovcik & Murray

[57] ABSTRACT

In a supply head of a nut feeder, a guide member having both side walls guiding both end surfaces in minor axis direction of a flange portion of a transferred T-nut is fixed to the front end of a rod arranged movable forward and backward within a sleeve and magnetized for prescribed time so as to attract the T-nut to its holding surface at the top end. When the T-nut is attracted by the holding surface at the top end of the rod and the rod is moved forward to the welding position of the work, the rod is demagnetized and the T-nut becomes free thereby the T-nut abuts on the guide pin on the work by inertia force and is rotated and held to prescribed position on the work. In this case, both end surfaces in the minor axis direction of the flange portion of the T-nut are guided by both side walls of the guide member, and the T-nut is rotated in proper attitude and held to the correct welding position on the work.

2 Claims, 4 Drawing Sheets

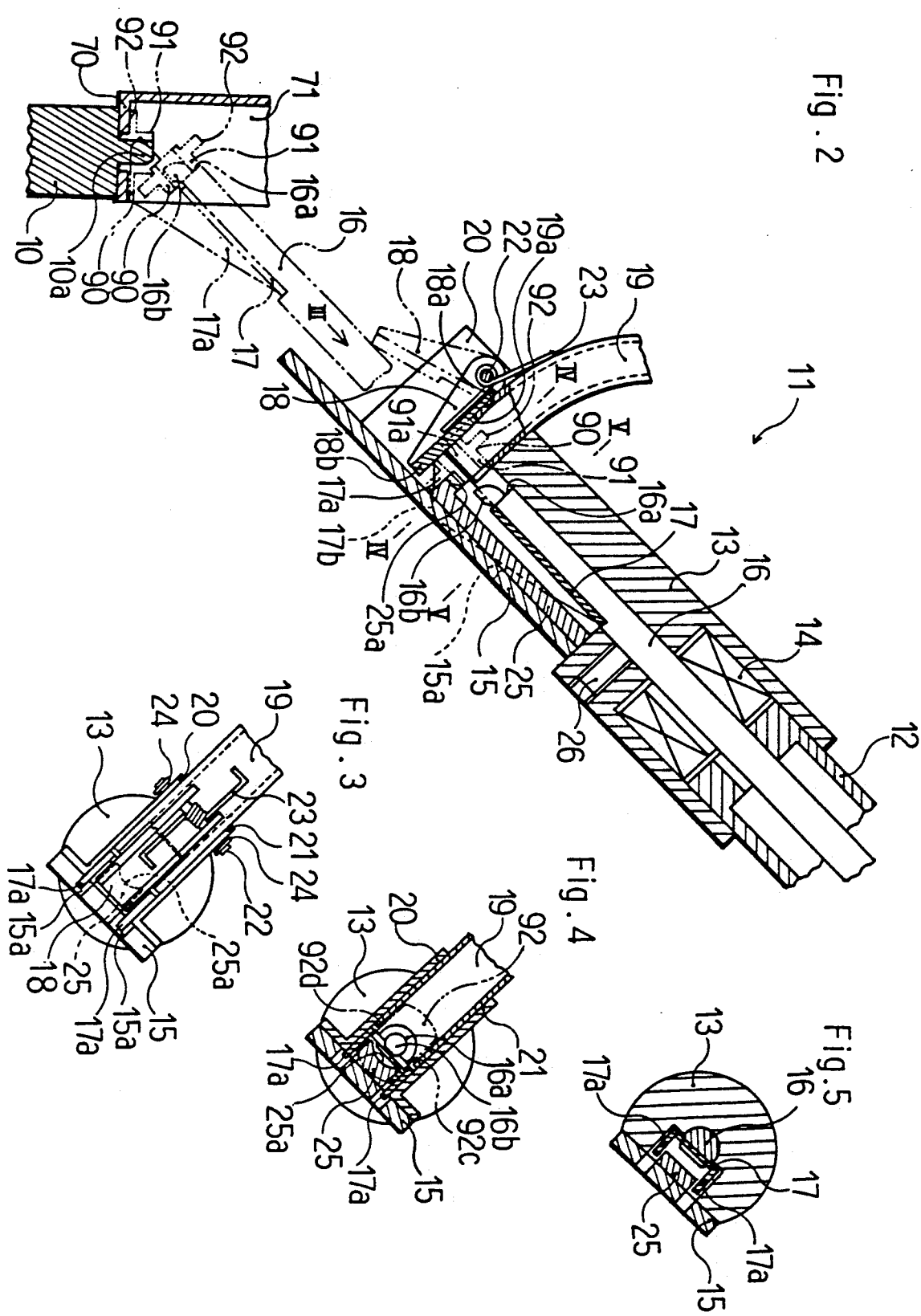

SUPPLY HEAD OF NUT FEEDER

BACKGROUND OF THE INVENTION

The present invention relates to a supply head of a nut feeder where a welding nut is supplied to prescribed welding position of a work.

In the prior art, such a supply head disclosed in Japanese Utility Model Publication No. 56-14943/1981 shown in FIG. 1 is known.

The supply head 1 is provided at the front end of the supply head body 2 with a sleeve 3 where a welding nut 80 transferred through a chute 9 is received in the inside of the front end. Within the sleeve 3 is arranged a rod 6 which is capable of being moved forwar and backward in the axial direction of the sleeve 3 and provided at the front end surface with a holding surface 6a capable of attracting the end surface of the welding nut 80 transferred into the sleeve 3 during the forward motion after magnetization for prescribed time and with a projection 6b inserted in a tapped hole 80a at the center. A shutter 8 being opened or closed freely so as to block the front side of the transferred welding nut 80 is arranged at the front end of the sleeve 3. On the lower surface of the front end of the rod 6 is fixed a guide rod 7 guiding a welding nut circumferential surface 80b when the transferred welding nut 80 is disposed at the prescribed welding position of a work 60. Numeral 4 designates a coil to magnetize the rod 6 for prescribed time, and numeral 5 designates a stopper where the welding nut 80 transferred through the chute 9 is stopped within the sleeve 3.

The supply head 1 is operated as follows.

First, the welding nut 80 is transferred through the chute 9 to the inside of the front end of the sleeve 3 from the upper side.

The rod 6 is magnetized and moved forward. In this case, the projection 6b of the rod 6 is inserted in the tapped hole 80a of the welding nut 80 and the holding surface 6a of the rod 6 attracts the end surface of the welding nut 80, and the welding nut 80 opens the shutter 8 and is separated together with the front end of the rod 6 from the sleeve 3.

When the front end of the rod 6 is advanced to the welding position of the work 60, a part of the lower edge of the welding nut 80 abuts on the upper surface of the work 60. In this case, since the rod 6 is demagnetized and the attracting force is released, the welding nut 80 is rotated about the abutting position with the work 60 as a fulcrum and the circumferential surface 80b is guided by the guide rod 7 at the front end of the rod 6, thereby the welding nut 80 is fitted to a guide pin 10a of a lower electrode 10 of a welder and is arranged in the prescribed direction to the prescribed welding position of the work 60.

And then the rod 6 is moved backward and returned to the origianl position, and next welding nut 80 is supplied in similar manner.

When a part of the lower edge of the welding nut 80 abuts on the upper surface of the work 60 and the welding nut 80 is rotated and arranged to the prescribed position of the work 60, the supply head 1 utilizes the guide rod 7 at the front end of the rod 6 guiding the circumferential surface 80b of the welding nut 80 and guides the arranging direction of the welding nut 80.

Consequently, the supply head 1 can direct the transferred welding nut 80 to the prescribed direction and arrange it in the work 60, thereby the welding nut 80 of quadrilateral, hexagon or the like can be supplied stably.

In the supply head 1 in the prior art, however, when a T-shaped welding nut (hereinafter referred to as 'T-nut') 90 as shown in FIGS. 10–12 is supplied, it cannot be supplied stably in some case. This occurs, for example, in the case that the T-nut 90 is supplied to a narrow portion of a work 70 as shown in FIGS. 10, 11. The T-nut 90 is provided with a tapped portion 91 and a flange portion 92, where the tapped portion 91 is of cylindrical shape, and the flange portion 92 is of rectangular plate shape and both end surfaces 92a, 92b in major axis direction are convexly curved arcuate surfaces and both end surfaces 92c, 92d in minor axis direction are made planes in parallel to each other.

In order to supply the T-nut 90 to the work 70 utilizing the supply head 1, a problem occurs first in that the projection 6b of the rod cannot be inserted in the tapped hole 91a of the nut.

That is, in such a T-nut 90, since the flange portion 92 is forged in disk shape at first by a press or the like and then both end surfaces 92c, 92d in minor axis direction are only formed by cutting work, it is inevitable that length of the flange portion 92 in major axis direction and arrangement of the tapped portion 91 of the flange portion 92 in major axis direction become uneven. Consequently, when the T-nut 90 transferred through the chute 9 from the upper side in the state of the major axis direction of the flange portion 92 being made nearly the vertical direction is stopped by the stopper 5 in the abutting state of the end surface 92a of the flange portion 92, the arrangement cannot be performed in some case so that the tapped hole 91a of the T-nut is always coincident with the front side of the projection 6b of the rod.

Even if the attraction to the rod 6 is performed properly, when the T-nut 90 is inserted between side walls 71, 71 of the work from the X-direction, the T-nut 90 cannot be inserted in some case.

That is, the T-nut 90 is attracted and moved in the state that the major axis direction of the flange portion 92 is arranged in nearly the vertical direction with respect to the rod 6, but since dimension L of the flange portion 92 in major axis direction is longer than dimension S in minor axis direction and the major axis direction of the flange portion 92 is arranged in nearly the vertical direction, the rotation moment about the tapped portion 91 being the center is liable to act. Consequently, the flange portion 92 is liable to be rotated in the attracted state to the holding surface 6a of the rod by vibration or the like. When the T-nut 90 has been rotated, during inserting between the work side walls 71, 71, the flange portion 92 abuts on the side walls 71, 71 and the T-nut 90 is detached from the rod 6 in some case.

Further, even if the inserting is performed between the work side walls 71, 71 properly, when the tapped portion 91 is fitted to the guide pin 10a of the prescribed lower electrode, the tapped portion 91 cannot be fitted to the guide pin 10a in some case.

That is, during the arrangement to the upper surface of the work 70, the lower edge of the end surface 92a in the major axis direction of the flange portion abuts on the upper surface of the work 70 and the T-nut 90 is rotated and arranged about the abutting portion as a fulcrum. In this case, since the end surface 92a being the fulcrum portion is made as a arcuate surface, the rotation moment about the tapped portion 91 being the center also acts on the T-nut 90. Consequently, the unnecessary rotation is applied to the T-nut 90, and the tapped portion 91 cannot be fitted to the guide pin 10a of the lower electrode in some case.

SUMMARY OF THE INVENTION

An object of the invention is to provide a supply head of a nut feeder wherein even if a T-nut is supplied to a narrow portion it can be supplied stably.

In a supply head of a nut feeder of the invention, a flange portion having both end surfaces in a major axis direction made as convexly curved arcuate surfaces and both end surfaces in minor axis direction made planes in parallel to each other is formed in a cylindrical tapped portion, and a T-nut transferred through a chute from the upper side in the state of the major axis direction of the flange portion being made nearly the vertical direction is arranged at a slant with respect to the prescribed welding position of the work.

The supply head is constituted by a sleeve arranged at the front end of the supply head body for connecting the chute to the front end; a nut holder fixed to the front end of the sleeve and having a semi-arc shaped receiving surface abutting on the outer circumferential surface of the lower side of the tapped portion of the T-nut transferred through the chute and holding the axial direction of the tapped portion of the T-nut in parallel to the sleeve; a rod arranged movable forward and backward in the sleeve axial direction within the sleeve and provided at the front end surface with a holding surface attracting the end surface of the tapped portion of the T-nut transferred during the forward motion after magnetization for a prescribed time and with a projection inserted in the tapped hole of the tapped portion of the T-nut at the center of the holding surface; guide members fixed to the front end of the rod and provided with two side walls guiding both side surfaces in minor axis direction of the flange portion of the transferred T-nut; and a shutter being opened or closed freely so as to lock the front side of the transferred T-nut at the front end of the sleeve.

In the supply head of the nut feeder, when the T-nut is transferred through the chute into the sleeve from the upper side in the state of the major axis direction of the flange portion being made nearly the vertical direction, the nut holder at its receiving surface receives the outer circumferential surface at the lower side of the tapped portion of the T-nut. The side walls of the guide members guide both side surfaces in the minor axis direction of the flange portion of the T-nut. Consequently, the T-nut is not slanted in the minor axis direction of the flange portion and held within the sleeve in the state of the major axis direction being made nearly the vertical direction.

The rod is magnetized and moved forward. In this case, the T-nut is guided downward within the sleeve by the nut holder receiving the tapped portion, and guided in the horizontal direction by the guide members guiding both side surfaces in the minor axis direction of the flange portion. That is, the T-nut is not held and guided with respect to the end surface in major axis direction of the flange portion where the dimension becomes uneven. Consequently, the tapped hole at the tapped portion of the T-nut can be arranged properly to the front side of the projection of the rod, and the projection of the rod can be easily inserted in the tapped hole of the T-nut and the holding surface of the rod attracts the end surface of the tapped portion of the T-nut thereby the T-nut opens the shutter and is detached together with the front end of the rod from the sleeve.

And then the front end of the rod is advanced to the welding position of the work, and the rod is demagnetized immediately before the T-nut abuts on the welding position of the work, thereby the T-nut is arranged to the prescribed welding position of the work. In this case, the T-nut is moved to the welding position of the work, and until it is arranged to the prescribed welding position of the work, both end surfaces in the minor axis direction of the flange portion are always guided by the guide members fixed to the front end of the rod. Consequently, even if the rotation moment about the tapped portion being the center acts, the rotation of the flange portion is prevented and the T-nut is arranged in the proper attitide to the upper surface of the work.

Accordingly, the supply head of the nut feeder of the present invention has effects in that the T-nut is attracted to the rod in the proper attitude, and then until it is arranged to the welding position of the work the rotation about the tapped portion being the center is prevented, thereby the T-nut can be directed securely to the prescribed direction and supplied and even if the T-nut is supplied to the narrow portion of the work, it can be supplied stably.

BRIEF DESCRIPTION OF THE DRAWINGS

FIG. 2 is a sectional view of a supply head as an embodiment of the invention;

FIG. 3 is a front view of the supply head taken from direction III in FIG. 2;

FIG. 4 is a sectional view of the supply head of portion IV—IV in FIG. 2;

FIG. 5 is a sectional view of the supply head of portion V—V in FIG. 2;

DESCRIPTION OF THE PREFERRED EMBODIMENTS

An embodiment of the invention will now be described based on the accompanying drawings.

Figure 1:
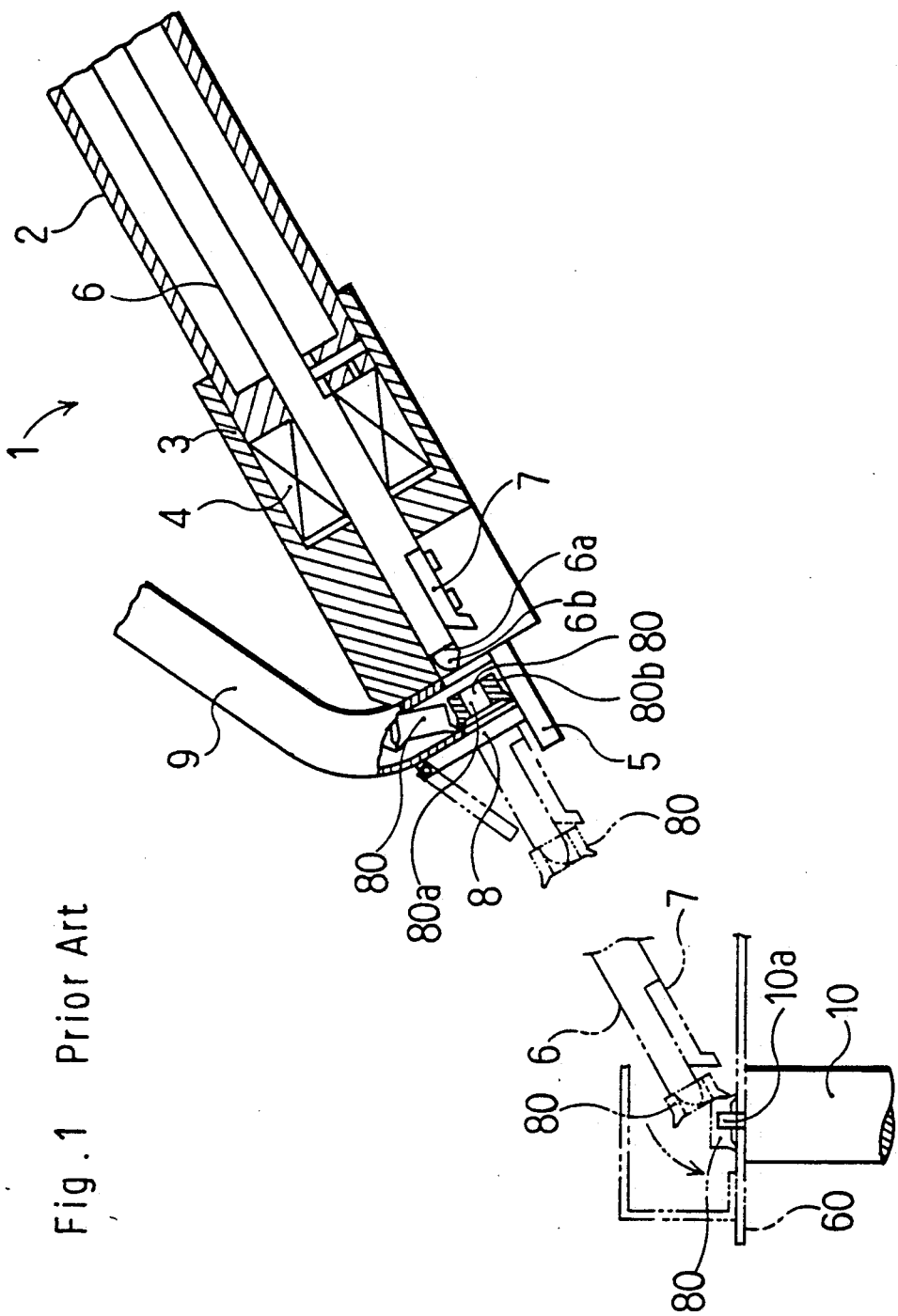
FIG. 1 is a sectional view of a supply head in the prior art.
Figure 6:
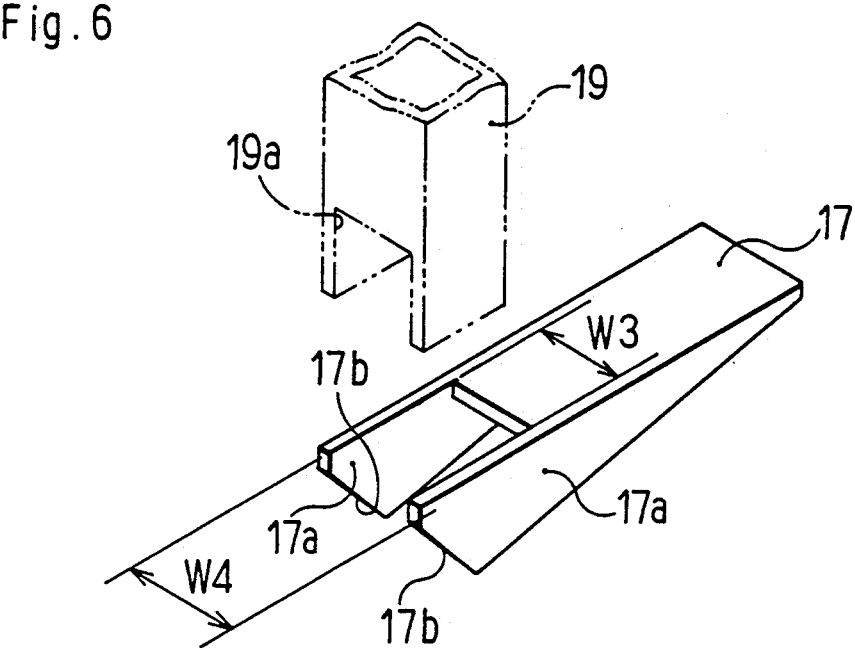
FIG. 6 is a perspective view of a guide member in the embodiment.
Figure 7:
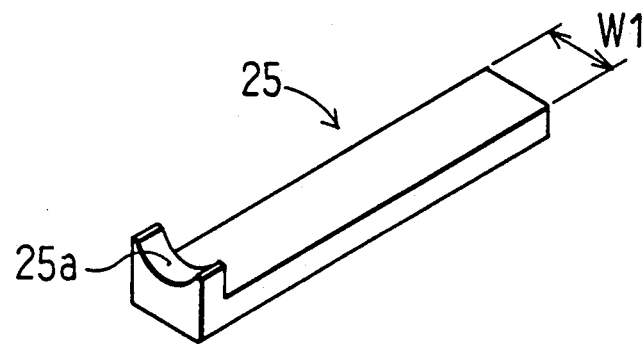
FIG. 7 is a perspective view of a nut holder in the embodiment.
Figure 8:
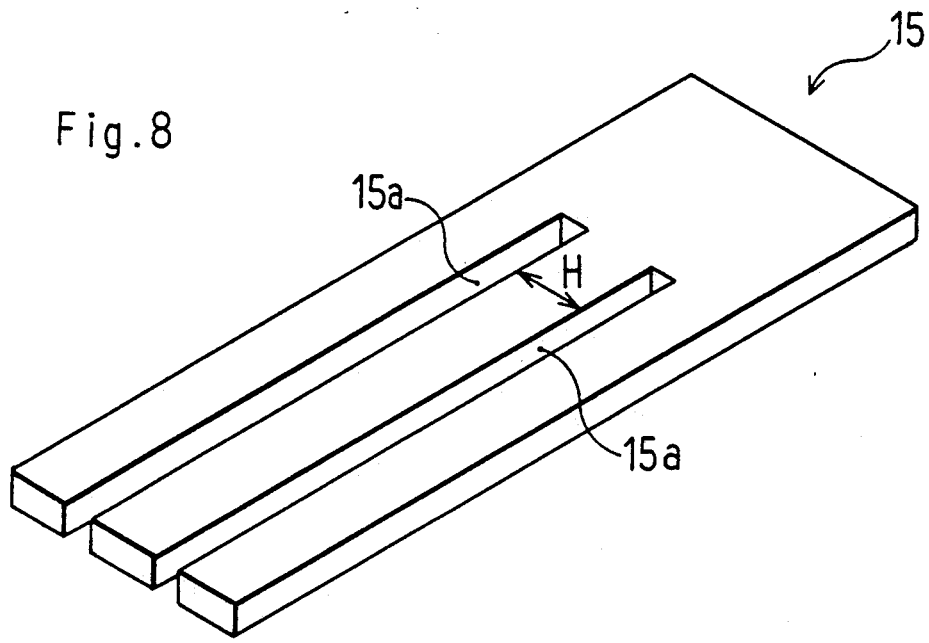
FIG. 8 is a perspective view of a bottom plate in the embodiment.

A supply head 11 shown in FIGS. 2-5 is provided at the front end of the supply head body 12 with a sleeve 13 where a T-nut 90 transferred through a chute 19 is received in the inside of the front end similarly to the prior art. The supply head 11 is arranged so that its axial direction together with the sleeve 13 is slanted by prescribed angle with respect to an upper surface of a work 70 arranged in the horizontal direction. The chute 19 is of rectangular pipe shape (refer to FIG. 6) connected to a parts feeder (not shown), and transfers a T-nut 90 into the sleeve 13 from the upper side in the state of major axis direction of a flange portion 92 being made nearly the vertical direction.

At a lower side of the sleeve 13 is fixed a bottom plate 15 with a nut holder 25 fixed on its upper surface. The bottom plate 15 is provided with two concave grooves 15a spaced by prescribed distance H along the axial direction of the sleeve 13 as shown in FIGS. 2-5 and FIG. 8. The holder 25 has width W1 nearly coincident with the distance H between the bottom plate concave grooves 15a and is provided with a semi-arc shaped receiving surface 25a fixed between the concave grooves 15 and disposed on the upper surface of the upper projecting portion of the front end as shown in FIGS. 2-5 and FIG. 7. The receiving surface 25a is formed in shape corresponding to outer circumferential surface of a tapped portion 91 of the T-nut, and is arranged to the prescribed position on the extension of the chute 19 at the front end of the sleeve 13 so that the axial direction of the tapped portion 91 of the transferred T-nut is made parallel to the sleeve 13 and a projection 16b of a rod as hereinafter described is inserted in a tapped hole 91a of the tapped portion 91.

A rod 16 being movable forward and backward in the axial direction of the sleeve 13 by a drive device such as an air cylinder (not shown) is arranged inside of the sleeve 13. The rod 16 is magnetized for a prescribed time by a solenoid coil 14 installed in the sleeve 13. At the front end of the rod 16 are formed a holding surface 16a attracting the end surface of the tapped portion 91 of the T-nut when the rod 16 is magnetized and moved forward, and a spherical projection 16b inserted in the T-nut tapped hole 91a at the center of the holding surface 16a. Similarly to the prior art, the rod 16 during the forward motion can move the holding surface 16a and the projection 16b to the vicinity of a guide pin 10a of a lower electrode 10 in a welder.

Further, at the lower side of the front end of the rod 16 is fixed a guide member 17 of non-magnetic material having two side walls 17a, 17a guiding both end surfaces 92c, 92d in minor axis direction of the flange portion 92 of the transferred T-nut as shown in FIGS. 2-5 and FIG. 6. The nut holder 25 is fixed on the bottom plate 15 and interposed between the sidewalls 17a which are arranged so that each side wall 17a is inserted into one of the concave grooves 15a of the bottom plate 15. A front end surface 17b on each side wall 17a is formed as a plane nearly in parallel to the upper surface of the work 70. The length of the side wall 17a projecting forward from the rod 16 is made so the length of the front end surface of the side wall is arranged slightly upward from the upper surface of the work 70 when the front end of the rod 16 is stopped in the vicinity of the guide pin 10a of the lower electrode during arrangement of the T-nut 90 as hereinafter described. Furthermore, width W4 of the guide member 17 is made dimension less than a width W5 between the inside walls 71 of the work 70.

Figure 9:
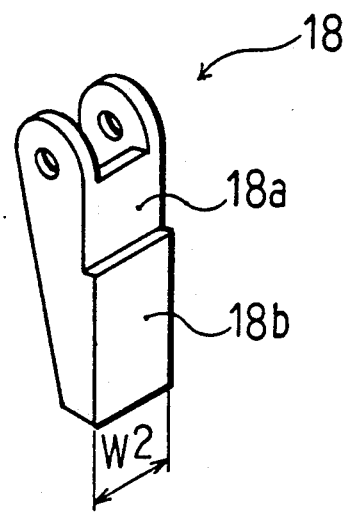
FIG. 9 is a perspective view of a shutter in the embodiment.
Figure 10:
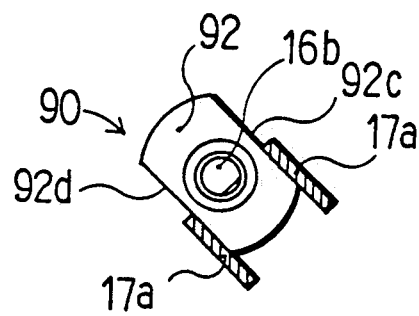
FIG. 10 is a sectional view of a T-nut during moving in the embodiment.
Figure 11:
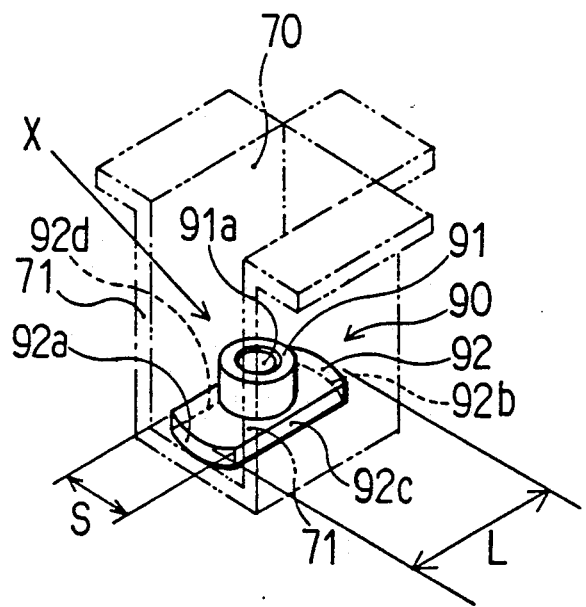
FIG. 11 is a perspective view of the T-nut.
Figure 12:
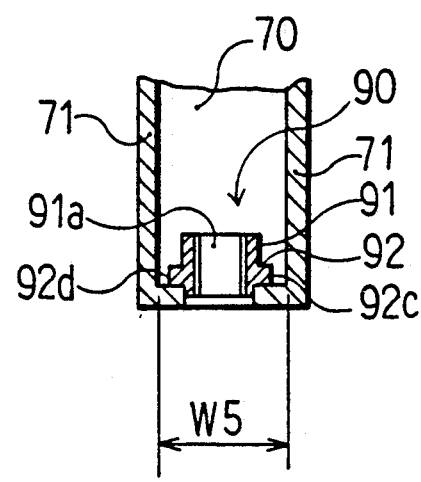
FIG. 12 is a sectional view illustrating state that the T-nut is supplied to a work.

At the front end of the sleeve 13 is arranged a shutter 18 locking the front side of the T-nut 90 transferred through brackets 20, 21 and a shaft 22 as shown in FIGS. 2, 3 and 9. The shutter 18 is biased to the normal close direction (counterclockwise direction about the shaft 22 in FIG. 2) by a torsional coil spring 23, but when the rod 16 attracting the T-nut 90 is moved forward, the T-nut 90 is not detached from the rod 16 but the shutter 18 is pushed by the T-nut 90 and can be rotated in the open direction. While the shutter 18 is closed, the upper side of the rear surface 18a abuts on the periphery of the side wall opening 19a at the lower end of the chute 19, and the projection 18b on the flat plate of the rear surface 18a forms the inner circumferential surface of the chute 19 and the transferred T-nut 90 can be held smoothly by the receiving surface 25a of the nut holder. The shutter 18 has the lower end extended to the vicinity of the bottom plate 15, and the width W2 is made to a dimension less than the width W3 between the side walls 17a of the guide member.

Numeral 24 designates an E-ring for preventing the shaft 22 from detaching, and numeral 26 designates a setscrew for guiding the circumferential surface of the rod 16 so that the rod 16 is not rotated during the forward and backward motion thereof.

Next, a mode of using the supply head 11 will be described.

First, the T-nut 90 is transferred from a parts feeder (not shown) through the chute 19 into the sleeve 13 from the upper side in the state of the major axis direction of the flange portion 92 being made nearly the vertical direction. Then the nut holder 25 at its receiving surface 25a receives the outer circumferential surface at the lower side of the tapped portion 91 of the T-nut, and the guide member 17 at its side walls 17a, 17a guides both end surfaces 92c, 92d in minor axis direction of the T-nut flange portion 92. The projection 18b of the shutter is arranged at the front surface of the T-nut 90. Consequently the T-nut 90 is not slanted by the nut holder 25, the guide member 17 and the shutter 18, but is held within the sleeve 13 in proper attitude so that the major axis direction of the flange portion 92 is made nearly the vertical direction, and further the axial direction of the tapped portion 91 is made parallel to the sleeve 13 and the tapped hole 91a is disposed forward to the projection 16b of the rod.

The work 70 is set to be fitted to the guide pin 10a of the lower electrode 10 of the welder, and a stationary switch (not shown) of the supply head 11 is turned on. Then a drive device such as an air cylinder (not shown) is operated and the coil 14 is energized thereby the rod 16 is magnetized and moved forward, and the projection 16b of the rod can be easily inserted in the tapped hole 91a of the T-nut and the holding surface 16a of the rod attracts the end surface of the tapped portion 91 of the T-nut thereby the T-nut 90 opens the shutter 18 and is detached together with the front end of the rod 16 from the sleeve 13.

And then the side walls 17a, 17a of the guide member 17 are inserted between the work side walls 71 and the front end of the rod 16 is advanced to the welding position of the work 70 thereby the forward motion is stopped, and energizing to the coil is rendered off immediately before the front surface of the T-nut 90 abuts on the guide pin 10a of the lower electrode. The rod 16 is demagnetized, and the T-nut 90 accompanied by inertia force is rotated on the guide pin 10a thereby the tapped hole 91a is fitted to the guide pin 10a and the work 70 is arranged to the prescribed position. While the T-nut 90 is detached from the sleeve 13 and moved to the welding position of the work, and while the rod 16 is stopped and the T-nut 90 is disposed to the upper surface of the work 70, both end surfaces 92c, 92d in the minor axis direction of the flange 92 are always guided by the side walls 17a of the guide member 17 fixed to the front end of the rod 16. Consequently, even if the rotation moment about the tapped portion 91 being the center acts on the T-nut 90, when vibration is applied to the T-nut 90 or the arc-shaped end surface 92 in the major axis direction of the flange portion abuts on the upper surface of the work 70 during fitting of the T-nut 90 to the guide pin 10a, the rotation is guided by the side walls 17a and the T-nut 90 is arranged on the upper surface of the work 70 in proper attitude directed to the prescribed direction. After the rod 16 is stopped for a definite time, it is moved backward by a drive device such as an air cylinder (not shown) and returned to the original position. After finishing the welding of the T-nut 90, next T-nut 90 is transferred from a parts feeder (not shown), and the already described process is repeated.

Accordingly, the supply head in the embodiment can securely supply the T-nut 90 to the prescribed direction, and even if the T-nut 90 is supplied to the upper surface of the work 70 between narrow side walls 71, it can be supplied stably.

When the T-nut 90 is supplied to further narrow portion, thickness of the side wall 17a of the guide member 17 may be made thin and the width W4 of the guide member 17 may be made small as the countermeasure, and if a small gap exists at the circumference of both end surfaces 92c, 92d in the minor axis direction of the flange portion in the supplied T-nut 90, it can be supplied stably.

What is claimed is:

1. A supply head of a nut feeder comprising:
   (a) a chute having a cylindrical body for transferring a T-shaped welding nut, said nut including a cylindrical tapped portion, and a flange portion formed in the tapped portion and having convexly curved arcuate end surfaces in a major axis direction and both end surfaces in a minor axis direction made planes in parallel to each other;
   (b) a sleeve arranged at a front end of the supply head body for connecting said chute to the font end, a coil mounted to said sleeve and a bottom plate fixed to a lower side of the front end, said bottom plate having a pair of grooves;
   (c) a nut holder fixed to said bottom plate between said grooves and having a semi-arc shaped receiving surface abutting on the outer circumferential surface of the lower side of the tapped portion of a nut transferred through said chute and holding the axial direction of the tapped portion of the nut in parallel to said sleeve;
   (d) a rod arranged movable forward and backward in the sleeve axial direction within said sleeve and selectively magnetized by energization of said coil, a front end of said rod having a holding surface attracting an end surface of the tapped portion of a transferred nut when said coil is energized to magnetize said rod and said rod is moved forward to insert a projection in the tapped hole of the tapped portion of the nut at the center of the holding surface;
   (e) a guide member fixed to the front end of said rod, said guide member having two side walls with each side wall movable in one of said bottom plate grooves and guiding an end surface in the minor axis direction of the flange portion of the transferred nut; and
   (f) a shutter being opend or closed freely so as to lock the front side of the transferred nut at the front end of said sleeve.

2. A supply head of a nut feeder as set forth in claim 1, wherein said shutter is biased to a closed position by a torsional coil spring, and the upper side of the rear surface of said shutter at the closed position abuts on a periphery of an opening of the side wall at the lower end of said chute and a projection at the lower side of the rear surface is coincient with the inner circumferential surface of said chute.

* * * * *